(12) United States Patent
Novikov

(10) Patent No.: US 12,505,228 B1
(45) Date of Patent: Dec. 23, 2025

(54) METHODS FOR NON-INVASIVE API DISCOVERY, MONITORING AND EXPLOITATION DETECTION IN THIRD-PARTY PROCESSES

(71) Applicant: Wallarm Inc., San Francisco, CA (US)

(72) Inventor: Ivan Novikov, San Francisco, CA (US)

(73) Assignee: Wallarm Inc., San Francisco, CA (US)

( * ) Notice: Subject to any disclaimer, the term of this patent is extended or adjusted under 35 U.S.C. 154(b) by 0 days.

(21) Appl. No.: 19/301,719

(22) Filed: Aug. 15, 2025

Related U.S. Application Data

(60) Provisional application No. 63/684,244, filed on Aug. 16, 2024.

(51) Int. Cl.
*G06F 21/57* (2013.01)
*G06F 21/56* (2013.01)

(52) U.S. Cl.
CPC .......... *G06F 21/577* (2013.01); *G06F 21/564* (2013.01); *G06F 21/566* (2013.01); *G06F 2221/034* (2013.01)

(58) Field of Classification Search
CPC ..... G06F 21/564; G06F 21/577; G06F 21/566
USPC ....................................................... 726/25
See application file for complete search history.

(56) References Cited

U.S. PATENT DOCUMENTS

| | | | |
|---|---|---|---|
| 7,058,968 B2 * | 6/2006 | Rowland | H04L 63/102 713/168 |
| 2007/0192863 A1 * | 8/2007 | Kapoor | H04L 67/63 726/23 |
| 2008/0229415 A1 * | 9/2008 | Kapoor | H04L 63/14 726/22 |
| 2008/0262990 A1 * | 10/2008 | Kapoor | H04L 67/306 706/20 |
| 2023/0421549 A1 * | 12/2023 | Allen | H04L 67/56 |
| 2024/0121261 A1 * | 4/2024 | Long | H04L 63/20 |
| 2024/0354407 A1 * | 10/2024 | Braggs | H04L 63/14 |

* cited by examiner

*Primary Examiner* — Teshome Hailu
(74) *Attorney, Agent, or Firm* — Ascenda Law Group, PC

(57) ABSTRACT

System and method for non-invasive monitoring and exploitation detection in third-party software processes. The system includes modules for scanning process memory to identify sensitive credentials such as application programming interface (API) keys and tokens, monitoring opened file descriptors including files, sockets, and inter-process communication channels, and analyzing network activity including domain name system (DNS) requests and encrypted connections. Runtime metadata such as privileges, environment variables and resource usage is also collected. The system correlates these signals to detect indicators of exploitation, such as unauthorized access, privilege escalation, or injected payloads, without modifying or instrumenting the monitored process. Integration with external security systems may enhance detection accuracy. Alerts and reports are generated in real-time to support incident response and forensic analysis.

20 Claims, 4 Drawing Sheets

METHODS FOR NON-INVASIVE API DISCOVERY, MONITORING AND EXPLOITATION DETECTION IN THIRD-PARTY PROCESSES

RELATED APPLICATIONS

This application is a non-provisional patent application of and claims priority to U.S. Provisional Application No. 63/684,244, filed 16 Aug. 2024, which is incorporated herein by reference in its entirety.

FIELD OF THE INVENTION

The present invention relates to the field of cybersecurity, with a particular emphasis on application programming interface (API) security, runtime monitoring, and exploitation detection for third-party software. It is particularly applicable to environments where direct instrumentation or invasive methods are not viable options, such as with compiled application programming interfaces (APIs), legacy systems, and certain enterprise-grade applications.

SUMMARY OF THE INVENTION

In various embodiments, the present invention provides an approach for non-invasive API discovery, monitoring, and exploitation detection within third-party processes during runtime. Systems configured in accordance with embodiments of the invention address the challenges of identifying and securing APIs used in compiled languages like Golang, legacy systems, and enterprise applications that cannot be instrumented or modified. Traditional techniques, such as eBPF (Extended Berkeley Packet Filter) or other instrumentation-based methods, are not feasible in such environments due to the inherent restrictions on modifying the process or its execution environment.

Embodiments of the present invention leverage a unique methodology that focuses on scanning the memory of third-party processes, monitoring opened streams and file descriptors, and analyzing runtime signals without disrupting the process itself. Embodiments of the present invention are designed to discover APIs, detect sensitive credentials like API keys or tokens, and monitor for potential exploitation attempts, all while operating within the strict constraints of non-invasiveness.

BRIEF DESCRIPTION OF THE DRAWINGS

The invention is now described, by way of example and without limiting the scope of the invention, with reference to the accompanying drawings which illustrate embodiments of the invention, in which.

Figure 1:
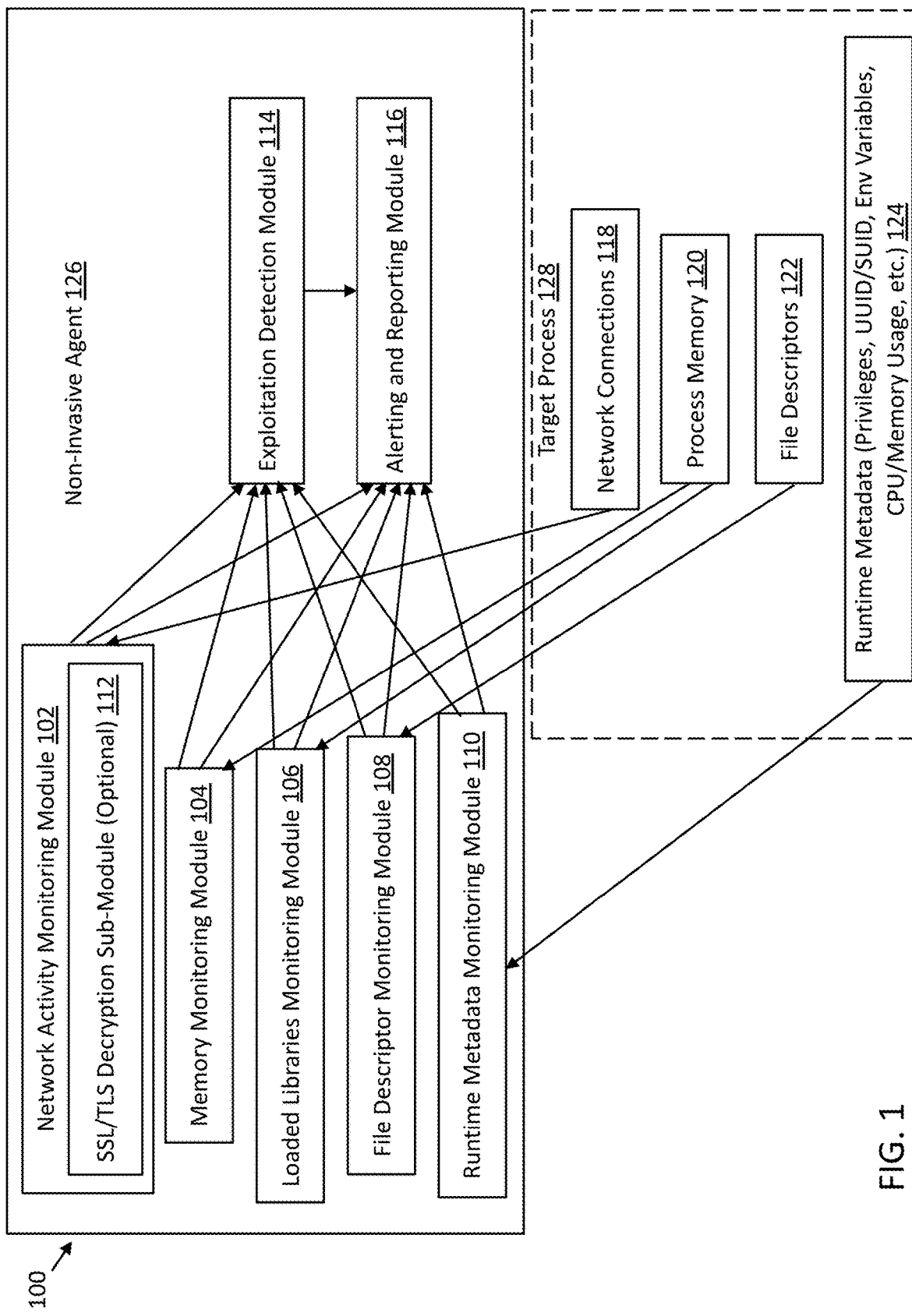
FIG. 1 illustrates a schema of non-invasive agent modules, in accordance with one embodiment of the present invention.

These and other embodiments of the invention are more fully described in association with the drawings below.

DETAILED DESCRIPTION

Among the unique aspects of embodiments of this invention is the ability to perform comprehensive API discovery and security monitoring in environments where traditional methods fall short. This includes:

1. Non-Invasive Memory Scanning: Embodiments of the invention include a non-invasive memory scanning method that can detect and extract API keys, tokens, and other sensitive credentials from third-party processes 128 in real-time. Unlike traditional approaches, this method does not require any modifications to the target process 128, making it ideal for compiled languages like Golang, legacy systems, and proprietary enterprise applications.

2. Monitoring Opened Streams and File Descriptors: In addition to memory scanning, embodiments of the invention monitor opened streams, file descriptors, and other runtime signals. By analyzing these elements, a system configured in accordance with the present invention can detect unauthorized access, unexpected file manipulations, and other indicators of exploitation attempts. This monitoring is performed without interfering with the operation of the process 128, maintaining the integrity and performance of the application.

3. Exploitation Detection Without Instrumentation: Systems configured in accordance with the invention are designed to detect exploitation attempts by correlating data from memory content, opened streams, and network activities with known attack signatures and payloads. This detection is achieved without the need for eBPF, probes, or other instrumentation techniques that could potentially disrupt the process 128 or violate operational constraints.

4. Application to Non-Instrumentable APIs: The present invention is particularly suited for use with APIs and applications that cannot be instrumented, either due to technical constraints (such as compiled codebases) or operational policies (such as those in enterprise environments). Systems configured in accordance with the invention operate entirely within the non-invasive framework, ensuring compatibility with a wide range of applications and environments.

5. Integration with Existing Security Systems: Embodiments of the present invention can seamlessly integrate with existing security infrastructures, including Next-Generation Firewalls (NGFW), Web Application Firewalls (WAF), Web Application and API Protection (WAAP) systems, Intrusion Detection Systems (IDS), and Intrusion Prevention Systems (IPS). By correlating findings with external attack signatures, systems configured in accordance with the invention enhance detection accuracy and reduce false positives.

6. Implementation in Compiled APIs and Legacy Systems: This invention is particularly innovative in its application to compiled APIs, such as those written in Golang, where traditional runtime instrumentation is not feasible. The memory scanning and stream monitoring techniques employed are designed to work in environments where the code cannot be modified or instrumented, providing a critical layer of security without compromising the stability or performance of the process 128. For legacy systems, which often run outdated or unsupported software, this non-invasive approach allows for modern security practices to be applied without the need to refactor or upgrade the underlying codebase. The present invention's ability to detect exploitation attempts through memory and runtime signals ensures that even older applications can be protected against contemporary threats.

Non-Invasive Agent Architecture.

FIG. 1 illustrates a schema 100 of non-invasive agent modules. The non-invasive agent architecture of the present invention provides a robust and comprehensive toolset for non-invasive monitoring and security of third-party processes 128. With modules 102, 104, 106, 108 designed to monitor memory 120, file descriptors 122, network activity, and loaded libraries, it offers unparalleled visibility into the runtime environment. The inclusion of an optional secure sockets layer/transport layer security (SSL/TLS) decryption sub-module 112 and advanced features for detecting dynamic-link library (DLL) hijacking and library-based exploitation ensures that even the most secure or legacy applications can be effectively monitored and protected. This architecture enables proactive threat detection and response, significantly enhancing the security posture of any organization using third-party processes 128.

The non-invasive agent 126 is designed to provide comprehensive monitoring and security for third-party processes 128, focusing on non-invasive techniques to ensure compatibility with compiled APIs, legacy systems, and enterprise applications. The architecture includes modules for monitoring memory 120, file descriptors 122, domain name system (DNS) requests, network connections 118, and loaded libraries. This design enables the detection of API keys, tokens, exploitation attempts, and potential vulnerabilities, including those related to dynamically loaded libraries.

Memory Monitoring Module 104

Purpose: The Memory Monitoring Module 104 is responsible for scanning the memory 120 of the target process 128 to identify API keys, tokens, and other sensitive credentials. It uses predefined templates to match the structure of various API keys (e.g., API keys from S3 of Amazon®, Inc. of Seattle, WA; API keys from OpenAI® of San Francisco, CA) and can detect known canary or compromised keys.

Functionality:
1. Pattern Matching: The memory monitoring module 104 employs a sophisticated pattern-matching algorithm to identify API keys and tokens based on their structure. It adapts to different formats and lengths of keys to ensure broad coverage across various services.
2. Data Structure Parsing: The memory monitoring module 104 parses and extracts data structures related to API requests and responses stored in memory 120, allowing it to monitor API usage and detect unauthorized access or data leaks.
3. Alert Generation: When a key or token matching a known compromised or canary credential is detected, the memory monitoring module 104 generates an alert for immediate investigation.

File Descriptor (FD) Monitoring Module 108

Purpose: The File Descriptor Monitoring Module 108 tracks all opened file descriptors by the target process 128, including files, network sockets, and pipes, providing insights into the process's interactions with the filesystem and external resources.

Functionality:
1. File Access Logging: The file descriptor monitoring module 108 logs every file opened by the target process 128, capturing details such as file paths, access types (read/write), and any subsequent modifications. This is crucial for detecting unauthorized data access or potential data exfiltration.
2. Socket Monitoring: For file descriptors representing network sockets, the file descriptor monitoring module 108 captures connection details, including remote IP addresses, ports, and protocols. This data is correlated with memory content and other runtime signals to detect suspicious activities.
3. Pipe Monitoring: Pipes and other inter-process communication (IPC) mechanisms are also monitored, providing insights into how the process interacts with other processes or services.

Network Activity Monitoring Module 102

Purpose: The Network Activity Monitoring Module 102 tracks all network connections initiated or received by the target process 128, including DNS requests, Transmission Control Protocol/User Datagram Protocol (TCP/UDP) connections, and other network-related activities.

Functionality:
1. DNS Request Tracking: The network activity monitoring module 102 logs all DNS requests made by the process 128, capturing queried domains and resulting IP addresses to identify potential connections to malicious domains or command-and-control servers.
2. Connection Logging: The network activity monitoring module 102 logs and analyzes all outbound and inbound connections, including remote Internet Protocol (IP) addresses, ports, and protocols (e.g., HTTP, HTTPS). It correlates this data with known malicious IPs or unusual connection patterns.
3. Encrypted Traffic Handling: For encrypted connections (e.g., HTTPS), the network activity monitoring module 102 includes an optional SSL/TLS decryption sub-module 112. If provided with the necessary keys or session data, it can decrypt the traffic to analyze the content, essential for deep packet inspection in secure environments.

SSL/TLS Decryption Sub-Module (Optional) 112

Purpose: The SSL/TLS Decryption Sub-Module 112 provides the capability to decrypt encrypted traffic, allowing the non-invasive agent 126 to monitor and analyze the content of secure connections.

Functionality:
1. Session Key Handling: The SSL/TLS decryption sub-module 112 uses SSL/TLS session keys to decrypt traffic in real-time, particularly useful when security teams need to inspect the contents of encrypted connections.
2. Decryption of Stored Data: In addition to live traffic, the SSL/TLS decryption sub-module 112 can decrypt stored encrypted data within the process memory 120 for comprehensive analysis.
3. Selective Decryption: The SSL/TLS decryption sub-module 112 supports selective decryption, enabling focus on specific sessions or traffic types, minimizing performance impact and ensuring privacy where necessary.

Loaded Libraries Monitoring Module 106

Purpose: The Loaded Libraries Monitoring Module 106 tracks all shared libraries (e.g., .so files on Linux, DLLs on Windows) loaded by the target process 128, performing signature checks, versioning, and vulnerability assessments to detect potential threats such as DLL hijacking, shell loading, and exploitation via dynamically loaded libraries.

Functionality:
1. Library Tracking: The loaded libraries monitoring module 106 continuously monitors and logs all libraries loaded by the process 128, including their file paths, names, and versions. This data is crucial for understanding the runtime environment of the process 128 and identifying any unusual or unauthorized library loads.
2. Signature Verification: Each loaded library is checked against a database of known signatures to verify its integrity. This ensures that the library has not been tampered with or replaced with a malicious version.
3. Version Checking and CVE Alerts: The loaded libraries monitoring module 106 checks the versions of all loaded libraries against known vulnerabilities (CVE (common vulnerabilities and exposure) database). If a library with a known vulnerability is detected, the module 106 generates an alert, providing details about the CVE and recommended remediation steps.
4. Detection of DLL Hijacking and Shell Loading: The loaded libraries monitoring module 106 is capable of detecting DLL hijacking attempts by identifying unauthorized or unexpected DLLs loaded by the process 128. Similarly, it monitors for .so file loading attacks in Unix-like systems, where an attacker might exploit dynamic loading to execute arbitrary code.
5. Filesystem Verification: The loaded libraries monitoring module verifies that the loaded libraries exist in the expected filesystem locations and checks their permissions. If any discrepancies are found, such as libraries being loaded from unusual locations or with incorrect permissions, an alert is generated.

Exploitation Detection Module 114

Purpose: The Exploitation Detection Module 114 analyzes data captured by the Memory Monitoring Module 104, FD Monitoring Module 108, Network Activity Monitoring Module 102, and Loaded Libraries Monitoring Module 106 to detect signs of exploitation or malicious behavior.

Functionality:
1. Payload Matching: The exploitation detection module scans memory, files, and network traffic for payloads or patterns matching known attack signatures, sourced from integrated Intrusion Detection Systems (IDS), Next-Generation Firewalls (NGFW), and other security systems.
2. Correlation with External Signals: The exploitation detection module cross-references findings with alerts and data from external security systems, enhancing exploitation detection accuracy. This correlation helps identify sophisticated attacks not immediately evident through memory or network analysis.
3. Behavioral Analysis: In addition to signature-based detection, the exploitation detection module performs behavioral analysis to identify anomalies in the process's behavior, indicative of exploitation attempts.

Runtime Metadata Monitoring Module 110

Purpose: The Runtime Metadata Monitoring Module 110 collects and analyzes critical runtime metadata 124 from the target process 128. This data includes privileges, unique identifiers (Universally Unique Identifier/Set User ID—UUID/SUID—bits), environment variables, CPU and memory usage, and other essential operational parameters. By monitoring these aspects, the runtime metadata monitoring module helps to detect abnormal or unauthorized behavior that could indicate a security threat or system misconfiguration.

Functionality:
1. Privileges Monitoring: The runtime metadata monitoring module 110 tracks the privileges or capabilities assigned to the process 128, such as root access or specific system capabilities. It checks for any unexpected elevation of privileges, which could indicate a potential security breach or misconfiguration.
2. UUID/SUID Bits Detection: This feature monitors the unique identifiers and setuid (set user ID upon execution)/setgid (set group ID permission) bits associated with the process 128. If the process 128 is running with elevated privileges or if these bits are set unexpectedly, the runtime metadata monitoring module 110 generates an alert for further investigation.
3. Environment Variables Monitoring: The runtime metadata monitoring module 110 captures and analyzes the environment variables of the process 128, looking for sensitive information (such as API keys or credentials) and checking for unexpected changes that might suggest tampering or misconfiguration.
4. CPU and Memory Usage Tracking: The runtime metadata monitoring module 110 continuously monitors the CPU and memory usage of the process 128. It identifies patterns of abnormal resource consumption, such as spikes in CPU usage or memory leaks, which could indicate performance issues, resource exhaustion attacks, or other forms of exploitation.
5. Process Owner Verification: The runtime metadata monitoring module 110 verifies the user or group that owns the process. Any changes in ownership or discrepancies between expected and actual owners are flagged as potential security concerns.
6. Alert Integration: When the runtime metadata monitoring module 110 detects abnormal behavior or potential security issues within the runtime metadata 124, it triggers alerts that are sent to the Alerting and Reporting Module 116. These alerts include detailed information about the specific metadata that triggered the alert and the potential implications.
7. Integration with Exploitation Detection: The collected runtime metadata is also passed to the Exploitation Detection Module 114, where it is correlated with other data (such as memory content or network activity) to provide a comprehensive analysis of the security posture of the process 128.

This runtime metadata monitoring module 110 significantly enhances the ability of the agent 126 to detect and respond to a wide range of security threats by providing deep visibility into the runtime environment of the monitored process 128.

Alerting and Reporting Module 116

Purpose: The Alerting and Reporting Module 116 provides real-time notifications and detailed reports on detected security incidents, ensuring that security teams are promptly informed and equipped to respond effectively.

Functionality:
1. Real-Time Alerts: The alerting and reporting module 116 generates alerts upon detecting potential security incidents, detailing the affected process 128, the nature of the threat, and the specific data or activity that triggered the alert.
2. Comprehensive Reporting: In addition to real-time alerts, the alerting and reporting module 116 produces detailed reports including a full incident timeline, captured data from each monitoring module 102, 104, 106, 108, 110, and mitigation recommendations. Reports can be exported in various formats for further analysis or compliance needs.

Use Case: A Day in the Life of an Enterprise User

Figure 2:
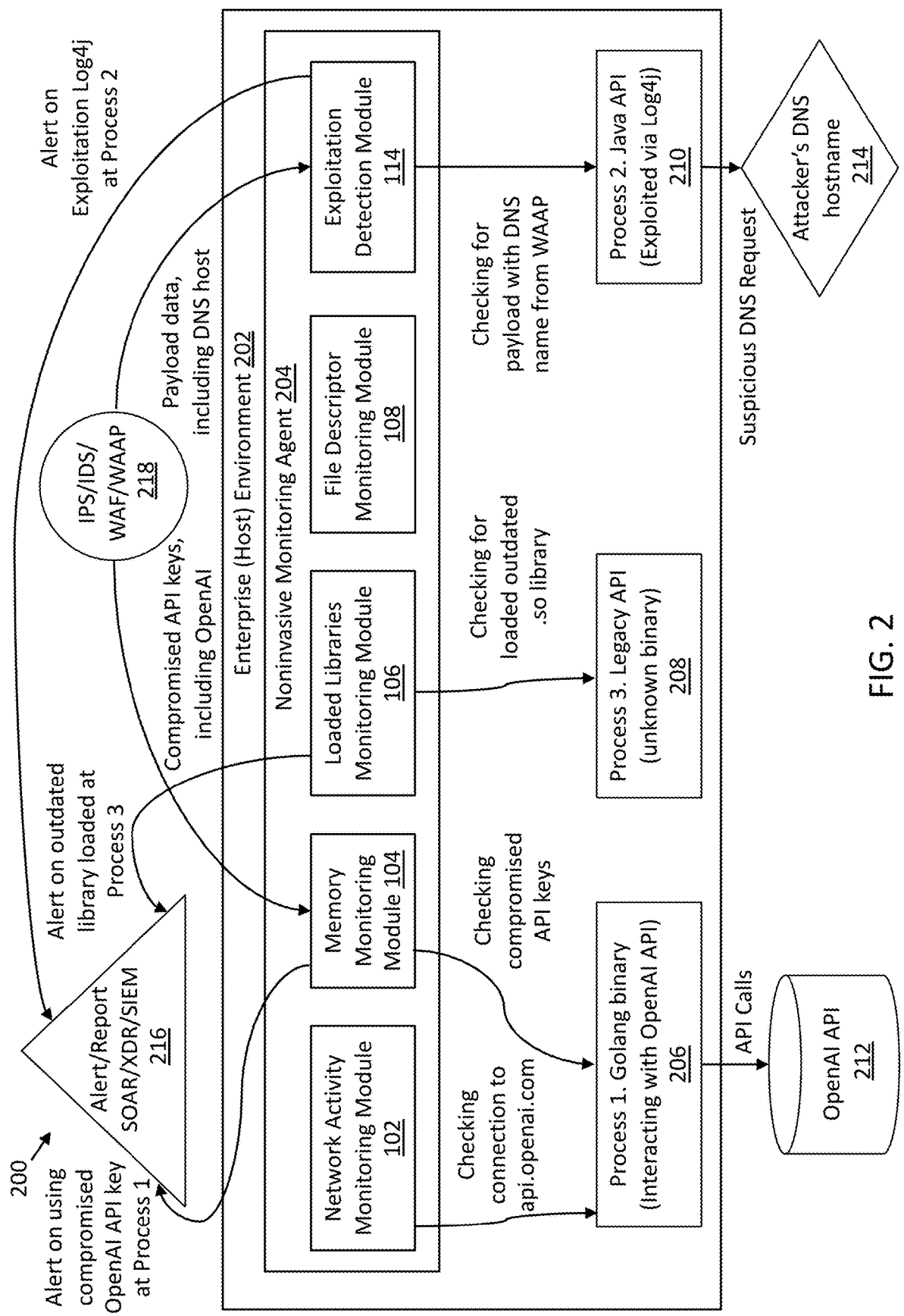
FIG. 2 illustrates an example use case scenario in which an enterprise security engineer utilizes the system, in accordance with one embodiment of the present invention.

FIG. 2 illustrates an example use case scenario in which an enterprise security engineer utilizes the system 200.

Scenario Overview

Referring now to FIG. 2, in this scenario we follow an enterprise security engineer who utilizes a system 200 configured in accordance with an embodiment of the present invention to identify and mitigate a security threat in a network. More specifically, the enterprise security engineer employs a system 200 configured with a non-invasive agent 204 of the kind described above to monitor and secure processes within the engineer's organization. The focus is on discovering processes that utilize the OpenAI® ChatGPT® API, extracting API keys, and detecting an exploited process due to a Remote Code Execution (RCE) attack leveraging the Log4j vulnerability (CVE-2021-44228). Using the present non-invasive agent 204, the engineer successfully identifies the malicious activity and takes action to mitigate the threat.

Morning: Discovering OpenAI® ChatGPT® API Usage

The day begins with the engineer initiating a routine scan to identify all processes 128 within the organization that are interacting with the OpenAI® ChatGPT® API 212. The non-invasive agent 204, running on the enterprise environment 202 and equipped with its powerful monitoring modules 102, 104, 106, 108, begins by identifying processes based on opened connections, file descriptors 122, and other runtime signals.

Process Identification:

The non-invasive agent 204 (specifically Network Activity Monitoring Module 102) scans for processes 206 establishing connections to API endpoints 212 from OpenAI®, specifically those related to the ChatGPT® service. It filters these processes by inspecting their network activity, focusing on DNS requests that resolve to OpenAI's domains and connections to API endpoints.

Memory Scanning:

Once the relevant processes 206 are identified, the Memory Monitoring Module 104 kicks in. It scans the memory of these processes 206 to extract API keys associated with OpenAI® ChatGPT®. The agent 204 utilizes predefined templates to locate these keys and their associated attributes, such as usage limits and permissions.

API Key Extraction:

The engineer receives a report generated by the non-invasive agent 204, listing all discovered API keys, their attributes, and associated processes. This information includes:

1. The API key itself.
2. Associated usage limits (e.g., rate limits, quota usage).
3. Permissions tied to the key, such as read/write access.

This data is crucial for the engineer to ensure that API keys are being used appropriately and are not exposed to unauthorized processes.

Afternoon: Detecting an Exploited Process Using Log4j Vulnerability

Later in the day, the engineer receives an alert 216 from the non-invasive agent 204 indicating suspicious activity related to one of the processes interacting with the OpenAI® API 212. The alert 216 is triggered by the Exploitation Detection Module 114, which has detected an anomaly in one of the monitored processes 210.

Payload Detection:

The non-invasive agent's Exploitation Detection Module 114 identifies suspicious payloads in the process memory 120 that resemble patterns associated with the Log4j vulnerability (CVE-2021-44228). The payload is identified as part of an RCE attack where an attacker has injected a malicious JNDI lookup string into the process 210 via a crafted API request.

WAF Integration and DNS Correlation:

The non-invasive agent 204 correlates this detected payload with data received from the Web Application Firewall (WAF) 218. The WAF logs indicate a series of API requests that were flagged as suspicious, containing a JNDI string that attempts to resolve to an external DNS hostname controlled by the attacker. The Network Activity Monitoring Module 102 confirms that this DNS request was indeed made by the exploited process. While the current example correlates the detected payload with data received from the WAF 218, it is also possible in other embodiments (not depicted) for the detected payload to be correlated with data received from the Intrusion Prevention System (IPS), Intrusion Detection System (IDS), or Web Application and API Protection (WAAP) 218. In one embodiment of the invention, memory monitoring module 104 may receive one or more compromised API keys (including compromised API keys from OpenAI®) from the IPS, IDS, WAF or WAAP 218.

Memory Analysis:

Diving deeper, the Memory Monitoring Module 104 retrieves the payload details directly from the process memory 120. The engineer sees that the payload includes the attacker's DNS hostname 214 and the injected JNDI string. This confirms that the process 210 has been exploited via the Log4j vulnerability.

Library Monitoring:

The Loaded Libraries Monitoring Module 106 also identifies that the process 208 loaded a compromised or unauthorized .so (shared object) file, indicative of a potential follow-up action by the attacker to establish persistence or further exploit the system.

Late Afternoon: Mitigating the Threat

With the evidence in hand, the engineer moves swiftly to mitigate the threat.

Immediate Response:

The engineer terminates the compromised process to prevent further exploitation. The engineer revokes the API key associated with the process to ensure that it cannot be reused by the attacker.

Vulnerability Patch:

The engineer reviews a report 216 from the Loaded Libraries Monitoring Module 106, which confirms the presence of a vulnerable version of the Log4j library. A patch is applied across the affected systems to update Log4j to a secure version, closing the vulnerability.

Security Enhancements:

To prevent future attacks, the engineer configures additional rules in the WAF 218 to block suspicious API requests that contain patterns indicative of Log4j exploit attempts. The engineer also implements stricter monitoring and alerting for processes that load unexpected or unauthorized libraries.

Post-Incident Reporting:

Finally, the engineer generates a comprehensive incident report 216 using the non-invasive agent's Alerting and Reporting Module 116 (not depicted in FIG. 2). This report 216 includes details of the exploited process, the detected payload, the attacker's DNS hostname, and the steps taken to mitigate the threat. The report 216 is shared with the wider security team and management to review the incident and improve overall security posture.

CONCLUSION

By the end of the day, the engineer has successfully identified and mitigated a significant security threat, thanks to the comprehensive monitoring capabilities of the non-invasive agent 204. The ability to discover API usage, extract sensitive information, and detect exploitation attempts in real-time has proven invaluable in protecting the organization from sophisticated attacks. This use case demonstrates the effectiveness of the non-invasive agent 204 in ensuring the security and integrity of processes interacting with critical APIs like OpenAI® ChatGPT® 212, even in the face of emerging vulnerabilities like Log4j.

Figure 3:
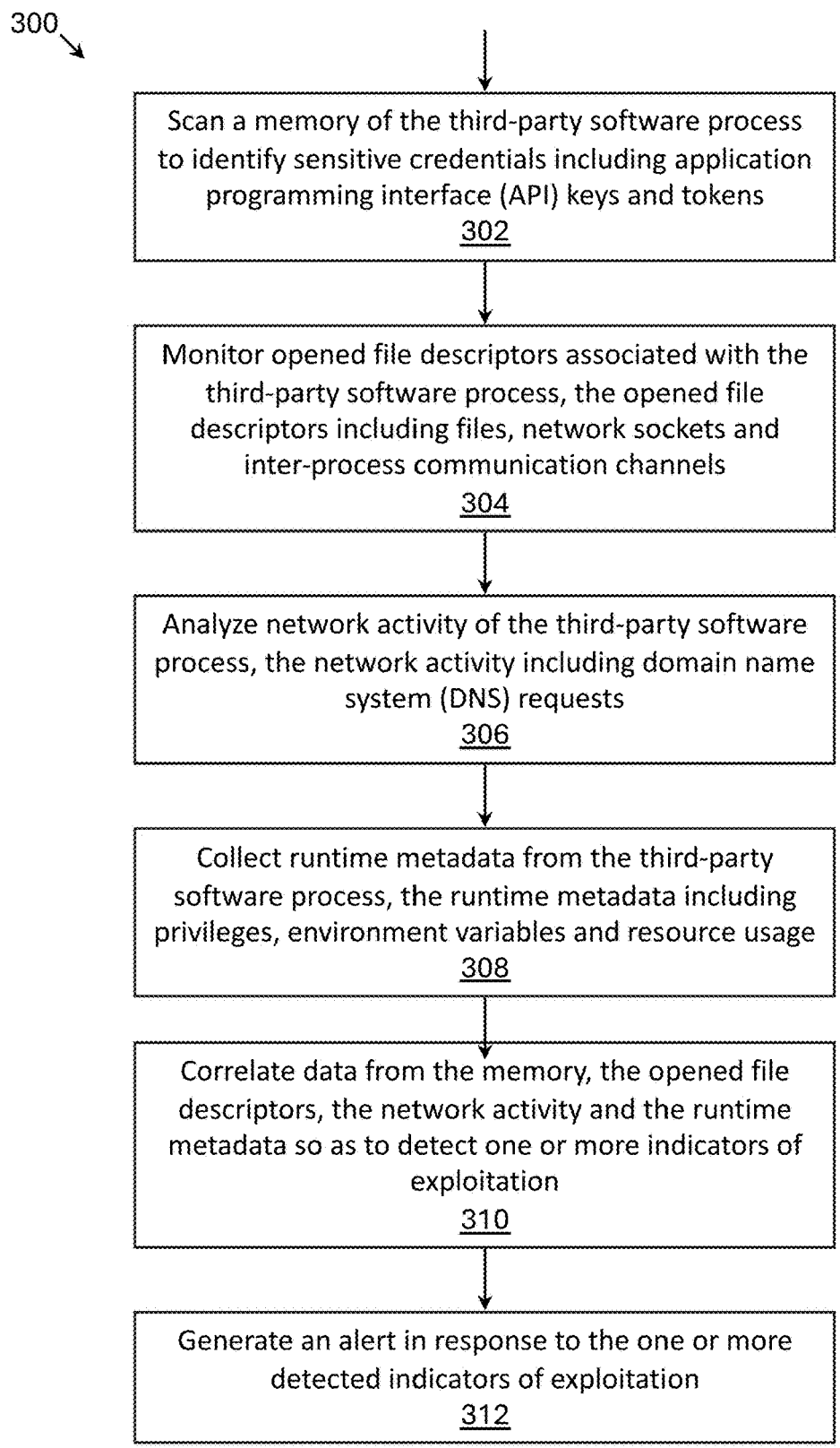
FIG. 3 depicts a flow diagram of a process for non-invasive monitoring and exploitation detection in a third-party software process, in accordance with one embodiment of the present invention.

FIG. 3 depicts a flow diagram 300 of a process for non-invasive monitoring and exploitation detection in a third-party software process. In step 302, non-invasive agent 126, 204 (specifically memory monitoring module 104) may scan a memory 120 of the third-party software process 128 to identify sensitive credentials including application programming interface (API) keys and tokens.

In step 304, non-invasive agent 126, 204 (specifically file descriptor monitoring module 108) may monitor opened file descriptors 122 associated with the third-party software process 128. The opened file descriptors 122 may include files, network sockets and inter-process communication channels. In step 304, non-invasive agent 126, 204 may analyze network activity of the third-party software process 128. The network activity may include domain name system (DNS) requests.

In step 306, non-invasive agent 126, 204 (specifically runtime metadata monitoring module 110) may collect runtime metadata 124 from the third-party software process 128. The runtime metadata 124 may including privileges, environment variables and resource usage.

In step 308, non-invasive agent 126, 204 (specifically exploitation detection module 114) may correlate data from the memory 120, the opened file descriptors, the network activity and the runtime metadata 124 so as to detect one or more indicators of exploitation.

In step 310, non-invasive agent 126, 204 (specifically alerting and reporting module 116) may generate an alert in response to the one or more detected indicators of exploitation. In one embodiment, the method may be performed without modifying or instrumenting the third-party software process 128.

Figure 4:
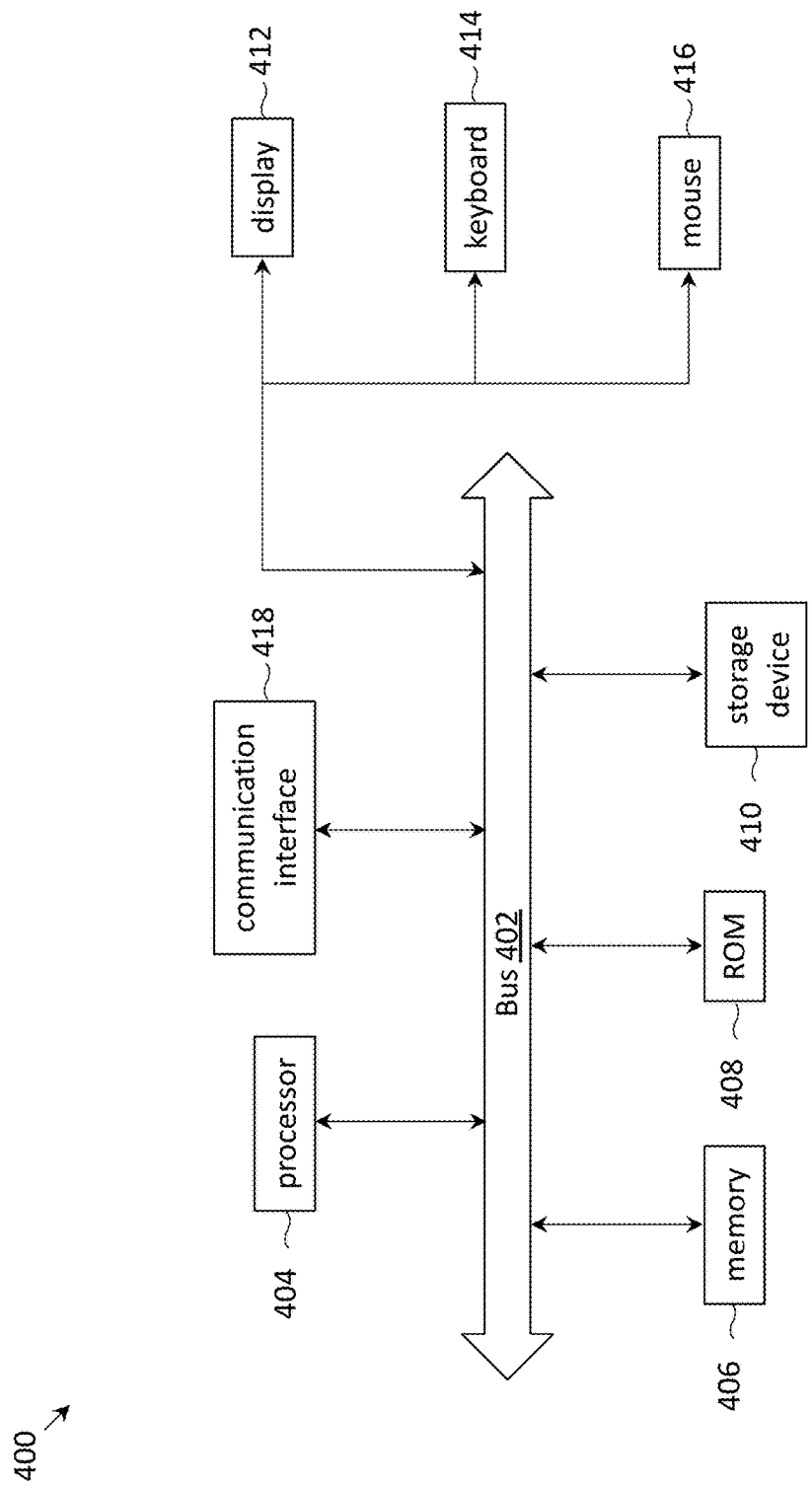
FIG. 4 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 4 provides an example of a system 400 that may be representative of any of the computing systems discussed herein (e.g., system represented by schema 100, system 200). Examples of system 400 may include a smartphone, a desktop, a laptop, a mainframe computer, an embedded system, etc. Note, not all of the various computer systems have all of the features of system 400. For example, certain ones of the computer systems discussed above may not include a display inasmuch as the display function may be provided by a client computer communicatively coupled to the computer system or a display function may be unnecessary. Such details are not critical to the present invention.

System 400 includes a bus 402 or other communication mechanism for communicating information, and a processor 404 coupled with the bus 402 for processing information. Computer system 400 also includes a main memory 406, such as a random access memory (RAM) or other dynamic storage device, coupled to the bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to the bus 402 for storing static information and instructions for the processor 404. A storage device 410, for example a hard disk, flash memory-based storage medium, or other storage medium from which processor 404 can read, is provided and coupled to the bus 402 for storing information and instructions (e.g., operating systems, applications programs and the like).

Computer system 400 may be coupled via the bus 402 to a display 412, such as a flat panel display, for displaying information to a computer user. An input device 414, such as a keyboard including alphanumeric and other keys, may be coupled to the bus 402 for communicating information and command selections to the processor 404. Another type of user input device is cursor control device 416, such as a mouse, a trackpad, or similar input device for communicating direction information and command selections to processor 404 and for controlling cursor movement on the display 412. Other user interface devices, such as microphones, speakers, etc. are not shown in detail but may be involved with the receipt of user input and/or presentation of output.

The processes referred to herein may be implemented by processor 404 executing appropriate sequences of computer-readable instructions contained in main memory 406. Such instructions may be read into main memory 406 from another computer-readable medium, such as storage device 410, and execution of the sequences of instructions contained in the main memory 406 causes the processor 404 to perform the associated actions. In alternative embodiments, hard-wired circuitry or firmware-controlled processing units may be used in place of or in combination with processor 404 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 400 or similar electronic computing device, that manipulates and transforms data represented as physical (electronic) quantities within its registers and memories into other data similarly represented as physical quantities within its memories or registers or other such information storage, transmission or display devices.

Computer system 400 also includes a communication interface 418 coupled to the bus 402. Communication interface 418 may provide a two-way data communication channel with a computer network, which provides connectivity to and among the various computer systems discussed above. For example, communication interface 418 may be a local area network (LAN) card to provide a data communication connection to a compatible LAN, which itself is communicatively coupled to the Internet through one or more Internet service provider networks. The precise details of such communication paths are not critical to the present invention. What is important is that computer system 400 can send and receive messages and data through the communication interface 418 and in that way communicate with hosts accessible via the Internet. It is noted that the components of system 400 may be located in a single device or located in a plurality of physically and/or geographically distributed devices.

Thus, methods for non-invasive API discovery, monitoring and exploitation detection in third-party processes have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer-implemented method for non-invasive monitoring and exploitation detection in a third-party software process, the method comprising:
   scanning, by a memory monitoring module, a memory of the third-party software process to identify sensitive credentials including application programming interface (API) keys and tokens;
   monitoring, by a file descriptor monitoring module, opened file descriptors associated with the third-party software process, the opened file descriptors including files, network sockets and inter-process communication channels;
   analyzing, by a network activity monitoring module, network activity of the third-party software process, the network activity including domain name system (DNS) requests;
   collecting, by a runtime metadata monitoring module, runtime metadata from the third-party software process, the runtime metadata including privileges, environment variables and resource usage;
   correlating, by an exploitation detection module, data from the memory, the opened file descriptors, the network activity and the runtime metadata so as to detect one or more indicators of exploitation; and
   generating, by an alerting and reporting module, an alert in response to the one or more detected indicators of exploitation, wherein the method is performed without modifying or instrumenting the third-party software process.

2. The computer-implemented method of claim 1, wherein scanning the memory comprises applying pattern-matching algorithms to detect the API keys based on predefined templates.

3. The computer-implemented method of claim 1, wherein monitoring the opened file descriptors comprises logging file access events and capturing details including file paths and access types.

4. The computer-implemented method of claim 1, wherein analyzing the network activity comprises decrypting secure sockets layer/transport layer security (SSL/TLS) traffic using session keys so as to inspect encrypted content.

5. The computer-implemented method of claim 1, wherein collecting the runtime metadata comprises detecting unexpected privilege elevation or changes in process ownership.

6. The computer-implemented method of claim 1, wherein collecting the runtime metadata further analyzing the environment variables for sensitive information or unexpected changes indicative of tampering.

7. The computer-implemented method of claim 1, wherein correlating the data comprises matching observed behavior with known attack signatures from external intrusion detection systems.

8. The computer-implemented method of claim 1, further comprising monitoring, by a loaded libraries monitoring module, one or more of file paths, names, and versions of libraries loaded by the third-party software process so as to detect unusual or unauthorized library loads.

9. The computer-implemented method of claim 1, wherein generating the alert comprises generating a report with one or more of incident details, recommended mitigation actions, and data captured from one or more of the memory monitoring module, the file descriptor monitoring module, the network activity monitoring module and the runtime metadata monitoring module.

10. The computer-implemented method of claim 1, wherein the one or more indicators of exploitation comprise one or more of unauthorized access and unexpected file manipulations.

11. A non-transitory computer-readable medium for non-invasive monitoring and exploitation detection in a third-party software process, the non-transitory computer-readable medium comprising instructions that, when executed by a processor, cause the processor to perform a method comprising:
   scanning, by a memory monitoring module, a memory of the third-party software process to identify sensitive credentials including application programming interface (API) keys and tokens;
   monitoring, by a file descriptor monitoring module, opened file descriptors associated with the third-party software process, the opened file descriptors including files, network sockets and inter-process communication channels;
   analyzing, by a network activity monitoring module, network activity of the third-party software process, the network activity including domain name system (DNS) requests;
   collecting, by a runtime metadata monitoring module, runtime metadata from the third-party software process, the runtime metadata including privileges, environment variables and resource usage;
   correlating, by an exploitation detection module, data from the memory, the opened file descriptors, the network activity and the runtime metadata so as to detect one or more indicators of exploitation; and
   generating, by an alerting and reporting module, an alert in response to the one or more detected indicators of exploitation, wherein the method is performed without modifying or instrumenting the third-party software process.

12. The non-transitory computer-readable medium of claim 11, wherein scanning the memory comprises applying pattern-matching algorithms to detect the API keys based on predefined templates.

13. The non-transitory computer-readable medium of claim 11, wherein monitoring the opened file descriptors comprises logging file access events and capturing details including file paths and access types.

14. The non-transitory computer-readable medium of claim 11, wherein analyzing the network activity comprises decrypting secure sockets layer/transport layer security (SSL/TLS) traffic using session keys so as to inspect encrypted content.

15. The non-transitory computer-readable medium of claim 11, wherein collecting the runtime metadata comprises detecting unexpected privilege elevation or changes in process ownership.

16. The non-transitory computer-readable medium of claim 11, wherein collecting the runtime metadata comprises analyzing the environment variables for sensitive information or unexpected changes indicative of tampering.

17. The non-transitory computer-readable medium of claim 11, wherein correlating the data comprises matching observed behavior with known attack signatures from external intrusion detection systems.

18. The non-transitory computer-readable medium of claim 11, further comprising monitoring, by a loaded libraries monitoring module, one or more of file paths, names, and versions of libraries loaded by the third-party software process so as to detect unusual or unauthorized library loads.

19. The non-transitory computer-readable medium of claim 11, wherein generating the alert comprises generating a report with one or more of incident details, recommended mitigation actions, and data captured from one or more of the memory monitoring module, the file descriptor monitoring module, the network activity monitoring module and the runtime metadata monitoring module.

20. The non-transitory computer-readable medium of claim 11, wherein the one or more indicators of exploitation comprise one or more of unauthorized access and unexpected file manipulations.

* * * * *